March 29, 1932.     D. W. McLENEGAN     1,851,716
METHOD OF AND MEANS FOR STARTING SYNCHRONOUS MOTORS
Filed Feb. 12, 1930
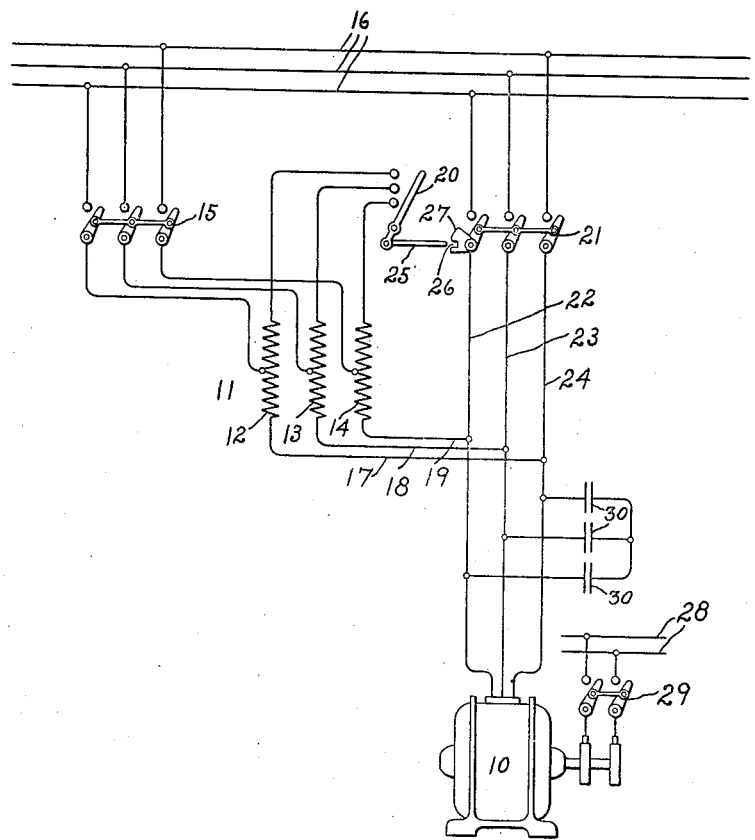
Inventor:
David W. McLenegan,
by Charles E. Tullar
His Attorney.

Patented Mar. 29, 1932

1,851,716

UNITED STATES PATENT OFFICE

DAVID W. McLENEGAN, OF SCHENECTADY, NEW YORK, ASSIGNOR TO GENERAL ELECTRIC COMPANY, A CORPORATION OF NEW YORK

METHOD OF AND MEANS FOR STARTING SYNCHRONOUS MOTORS

Application filed February 13, 1930. Serial No. 427,697.

My invention relates to the starting of synchronous motors, and has for its object the provision of a simple and reliable method of and means for starting synchronous motors wherein a voltage higher than the normal running voltage is used.

It is well known in the art to provide a synchronous motor with an auxiliary squirrel cage winding on its rotor whereby the motor may be started as an induction motor but without field excitation, and when it has been brought up to synchronous speed, locked in step by energizing the field winding. This method of starting, however, has the disadvantage that it provides an inherently low starting torque for motors of relatively low speeds, and consequently when normal voltage only is used a low speed motor cannot be started under full load, or substantially full load, conditions. It has also been proposed to apply an excess or higher than normal voltage to the motor on starting to improve its starting torque, but with this method difficulty has been encountered in preventing the motor from slowing up and falling out of step in the short interval while the connections are being changed from the excess voltage to the normal voltage. More particularly, it is an object of my invention to provide an improved method of and means for starting synchronous motors wherein the switching operations from excess to normal voltage may be carried out without danger of the motor falling out of step.

In carrying out my invention in one form I provide a starting compensator or autotransformer for applying an excess starting voltage, together with switching means whereby a winding of the compensator may be connected as a reactor in the motor circuit while the motor is switched from the excess starting voltage to the normal voltage.

For a more complete understanding of my invention, reference should be had to the accompanying drawing, the single figure of which is a diagrammatic illustration of a starting system for synchronous motors embodying my invention.

Referring to the drawing, in one form of my invention the synchronous motor 10, provided with the usual distributed armature winding on its stator member and further provided with a direct current field winding or winding on its rotor member together with a squirrel cage winding, or other suitable starting winding, on its rotor member, is supplied with an excess voltage during the starting period from the starting compensator or autotransformer 11. The motor is shown as a three-phase motor since this is a typical example, although it will be understood that my invention is applicable to motors having different numbers of phases. As shown, intermediate taps on the autotransformer windings 12, 13, and 14 may be connected through a switch 15 to a suitable three-phase source of supply 16 having a voltage equal to the normal running voltage of the motor. One terminal of each of the windings 12, 13, and 14 is connected directly to the motor. As shown the lower terminals of these windings are connected respectively through the conductors 17, 18, and 19 to the three armature terminals of the motor, while the remaining terminals of the autotransformer windings may be connected together by means of a switch 20 whereby the windings are connected in the well known Y connection. A switch 21 is provided whereby the motor armature may be connected through the conductors 22, 23, and 24 directly to the supply source 16 for normal running conditions.

A suitable interlock, shown as a mechanical interlock, is provided between switches 20 and 21 whereby neither switch can be closed when the other switch is closed or, in other words, only one switch can be closed at any one time. As shown this interlock comprises a bar 25 which is pivotably connected to the switch 20 so as to be moved longitudinally toward the right, as seen in the drawing, when the switch 20 is moved from the open position, as shown, to the left to the closed position. With the switch 21 open, the end of this bar moves into a notch or recess 26 provided for it in a cam 27 carried by switch 21 whereby the switch 20 can be closed, but when the switch 21 is closed, this bar engages the protruding or higher edge of the cam to prevent the closing of the switch 20. It will be understood that when the switch 21 is moved to the left to the closed position, the cam 27 is rotated through a small angle with the switch so that its higher position is in the path of the bar 25. Conversely, when the switch 20 is closed, the switch 21 is locked against closure by the engagement of the bar 25 in the recess 26. The field circuit of the motor may be connected to a suitable direct current source of supply 28 by means of a switch 29. As shown, capacitors 30 are provided to improve the power factor of the supply source.

In the starting of the motor the switch 20 is closed, the switch 21 being open, to establish the Y connection for the autotransformer and then the switch 15 is closed to apply an excess voltage from the autotransformer to the motor. At this time the switch 29 will be open so that the field of the motor will be deenergized. When the motor has accelerated to substantially synchronous speed on the excess voltage connections, the switch 29 will be closed to energize the field of the motor, whereupon the motor will be pulled into step. Assuming that the motor has accelerated to the synchronous speed and has been locked in step, by the energization of its field winding, the next step in the starting operation is the opening of the switch 20 whereby the motor armature is connected to the supply source 16 through portions of the windings 12, 13, and 14, the lower portions as indicated on the drawing, which portions act as reactors and while reducing the voltage applied to the motor somewhat, at the same time provide for sufficient voltage to hold the motor in step while the switch 21 is being closed which is done as soon as possible after the switch 20 has been opened. The closing of the switch 21 connects the motor directly to the supply source for normal running conditions, and the compensator is thereafter disconnected from the supply source by opening the switch 15.

In a typical installation it has been found that the voltage applied to the motor drops momentarily to about 80% of the supply source voltage during the changeover, so that when the switch 20 is opened power to the motor is not interrupted even though the voltage is thus reduced and, consequently, the operation of the motor is much less critical than would be the case if the motor were disconnected entirely from the power source in changing from one voltage to the other. Ample time is thus given for the change and there is little danger of the motor falling out of synchronism. It will be understood that it is assumed that the motor is started under load and consequently if it were deenergized entirely during the switching operation, its speed would decrease very quickly to such an extent that the motor might fall out of step.

What I claim as new and desire to secure by Letters Patent of the United States is:

1. In a starting system for synchronous motors, a supply circuit, a compensator, switching means for connecting said compensator to supply a voltage in excess of the supply circuit voltage to the motor to accelerate the motor to its synchronous speed and for connecting the motor to the supply circuit through a portion of said compensator acting as a reactor, and switching means for connecting the motor directly to the supply circuit.

2. In a starting system for synchronous motors a supply circuit, a compensator, switching means arranged in one position to connect said compensator to supply a voltage in excess of the supply circuit voltage to the motor and in another position to connect the motor to the supply circuit through a portion of said compensator acting as a reactor, and switching means for connecting the motor directly to the supply circuit 3. In a starting system for synchronous motors, a polyphase supply circuit, a polyphase compensator connected to supply a voltage in excess of the supply circuit voltage to the motor, a switch arranged when closed to connect the windings of said compensator together to supply said excess voltage to the motor and when open to connect the motor to the supply circuit through portions of the compensator windings, and a switch for connecting the motor directly to the supply circuit.

4. In a starting system for synchronous motors, a polyphase supply circuit, a polyphase compensator connected to supply a voltage in excess of the supply circuit voltage to the motor, a switch arranged when closed to connect the windings of said compensator together to supply said excess voltage to the motor and when open to connect the motor to the supply circuit through portions of the compensator windings, a switch for connecting the motor directly to the supply circuit, and interlocking means between said switches.

5. In combination with a three phase synchronous motor provided with a three phase armature winding, of a three-phase supply circuit, a three phase compensator connected to said armature winding, a switch for connecting intermediate points of said windings to said supply circuit, a switch for connecting the windings of said compensator in Y whereby a voltage in excess of the supply circuit voltage is applied to said armature winding, a switch for connecting said armature winding directly to the supply circuit, and interlocking means between the latter two switches whereby one can be closed only when the other is open.

6. The method of starting a synchronous motor from a supply circuit wherein a starting compensator is used which consists in connecting said compensator to said motor to apply a voltage in excess of the supply circuit voltage to accelerate the motor to its synchronous speed, thereafter connecting the motor to the supply circuit in series with a portion of the compensator acting as a reactor, then connecting the motor directly to the supply circuit, and finally disconnecting the compensator from the supply circuit.

In witness whereof, I have hereunto set my hand this 11th day of February, 1930.

DAVID W. McLENEGAN.